United States Patent
Ono et al.

(10) Patent No.: US 8,542,301 B2
(45) Date of Patent: Sep. 24, 2013

(54) ELECTRONIC IMAGE PICKUP APPARATUS INCLUDING AN IMAGE FORMING OPTICAL SYSTEM HAVING A MARK

(75) Inventors: Kenji Ono, Fussa (JP); Kazuhito Hayakawa, Hachioji (JP); Masato Katayose, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 230 days.

(21) Appl. No.: 13/136,382

(22) Filed: Jul. 28, 2011

(65) Prior Publication Data

US 2012/0033107 A1    Feb. 9, 2012

(30) Foreign Application Priority Data

Aug. 3, 2010    (JP) .................... 2010-174705

(51) Int. Cl.
  *H04N 9/64*   (2006.01)
  *H04N 5/225*   (2006.01)
  *H04N 17/02*   (2006.01)
  *G03B 13/22*   (2006.01)

(52) U.S. Cl.
  USPC .............. 348/251; 348/187; 348/340; 396/91

(58) Field of Classification Search
  USPC ............ 348/187, 188, 251, 335, 340; 396/91
  See application file for complete search history.

(56) References Cited

U.S. PATENT DOCUMENTS

| | | | |
|---|---|---|---|
| 6,940,550 B2 * | 9/2005 | Kitawaki et al. | 348/246 |
| 7,580,071 B2 * | 8/2009 | Uchiyama | 348/251 |
| 7,586,534 B2 | 9/2009 | Suto et al. | |
| 8,045,039 B2 * | 10/2011 | Chiang et al. | 348/335 |
| 2006/0215021 A1 | 9/2006 | Suto et al. | |
| 2010/0020180 A1 * | 1/2010 | Hill et al. | 348/188 |
| 2010/0194895 A1 * | 8/2010 | Steinberg et al. | 348/187 |
| 2011/0001837 A1 * | 1/2011 | Kotani | 348/208.99 |
| 2011/0080494 A1 * | 4/2011 | Mori et al. | 348/222.1 |

FOREIGN PATENT DOCUMENTS

| | | | |
|---|---|---|---|
| JP | 63-292781 | | 11/1988 |
| JP | 04269639 A | * | 9/1992 |
| JP | 08-116559 | | 5/1996 |
| JP | 2006-276743 | | 10/2006 |
| JP | 2010230745 A | * | 10/2010 |

* cited by examiner

*Primary Examiner* — John Villecco
(74) *Attorney, Agent, or Firm* — Kenyon & Kenyon LLP

(57) ABSTRACT

An electronic image pickup apparatus includes a plurality of lens units, an image forming optical system, and an image pickup element. The image forming optical system includes at least a lens unit nearest to object side which is disposed nearest to an object side, an aperture stop which is disposed on an image side than the lens unit nearest to object side, and an image-side lens unit which is disposed on the image side than the aperture stop. The lens unit nearest to object side includes a lens having a mark formed on an effective area of a lens surface thereof. At least any one of the lens in the image forming optical system is held such that, a shifting or a tilting of the lens can be adjusted. The electronic image pickup apparatus further includes a correction parameter storage section which stores correction parameters for correcting an unevenness of brightness due to the mark, and a signal processing section which corrects the unevenness of brightness due to the mark of which, an image has been picked up by the image pickup element, based on the correction parameter stored in the correction parameter storage section.

13 Claims, 16 Drawing Sheets

FIG. 6

SHIFT: 0
TILT: 0

| | WIDE ANGLE END | INTERMEDIATE FOCAL LENGTH STATE | TELEPHOTO END | |
|---|---|---|---|---|
| INFINITY | TABLE1a | TABLE2a | TABLE3a | APERTURE OPEN |
| | TABLE4a | TABLE5a | TABLE6a | MINIMUM APERTURE |
| CLOSE DISTANCE | TABLE7a | TABLE8a | TABLE9a | APERTURE OPEN |
| | TABLE10a | TABLE11a | TABLE12a | MINIMUM APERTURE |

FIG. 7

SHIFT : Max
TILT : 0

|  | WIDE ANGLE END | INTERMEDIATE FOCAL LENGTH STATE | TELEPHOTO END | |
|---|---|---|---|---|
| INFINITY | TABLE1b | TABLE2b | TABLE3b | APERTURE OPEN |
| | TABLE4b | TABLE5b | TABLE6b | MINIMUM APERTURE |
| CLOSE DISTANCE | TABLE7b | TABLE8b | TABLE9b | APERTURE OPEN |
| | TABLE10b | TABLE11b | TABLE12b | MINIMUM APERTURE |

FIG. 8

SHIFT : 0
TILT : Max

|  | WIDE ANGLE END | INTERMEDIATE FOCAL LENGTH STATE | TELEPHOTO END | |
|---|---|---|---|---|
| INFINITY | TABLE1c | TABLE2c | TABLE3c | APERTURE OPEN |
| | TABLE4c | TABLE5c | TABLE6c | MINIMUM APERTURE |
| CLOSE DISTANCE | TABLE7c | TABLE8c | TABLE9c | APERTURE OPEN |
| | TABLE10c | TABLE11c | TABLE12c | MINIMUM APERTURE |

FIG. 9

SHIFT : Max
TILT : Max

| | WIDE ANGLE END | INTERMEDIATE FOCAL LENGTH STATE | TELEPHOTO END | |
|---|---|---|---|---|
| INFINITY | TABLE1d | TABLE2d | TABLE3d | APERTURE OPEN |
| | TABLE4d | TABLE5d | TABLE6d | MINIMUM APERTURE |
| CLOSE DISTANCE | TABLE7d | TABLE8d | TABLE9d | APERTURE OPEN |
| | TABLE10d | TABLE11d | TABLE12d | MINIMUM APERTURE |

ELECTRONIC IMAGE PICKUP APPARATUS INCLUDING AN IMAGE FORMING OPTICAL SYSTEM HAVING A MARK

CROSS-REFERENCE TO RELATED APPLICATION

The present application is based upon and claims the benefit of priority from the prior Japanese Patent Application No. 2010-174705 filed on Aug. 3, 2010; the entire contents of which are incorporated herein by reference.

BACKGROUND OF THE INVENTION

1. Field of the Invention

The present invention relates to an electronic image pickup apparatus.

2. Description of the Related Art

An electronic image pickup system in which, it is possible to adjust a position of a member in an electronic image pickup system, based on a state of a mark which has been projected on an image pickup element has hitherto been known.

For instance, an electronic image pickup apparatus disclosed in Japanese Patent Application Laid-open Publication No. Hei 8-116559 has been known. In this case, a mark such as a resolution chart is disposed on an outer side of the image pickup system. An image of the chart is to be picked up by an image pickup system. Moreover, a position adjustment of the image pickup element is to be carried out based on a state of formation of a captured image of the chart on the image pickup element in the image pickup system.

Moreover, in Japanese Patent Application Laid-open Publication No. Sho 63-292781, an electronic image pickup system which uses another image pickup element has been disclosed. In this case, a filter having a resolution chart on a corner portion and Siemens chart on a central portion and an X-Y axes portion orthogonal to an optical axis is installed on a front surface of a lens. Moreover, the lens is brought to a macro state, and an image of the Siemens chart is formed on an image pickup surface, in a state of substantial depth of field. Accordingly, a shift (misalignment) of an optical axis of the lens and a center of an effective area of a solid image pickup element, a shift (misalignment) of an (effective area angle with respect to the X-Y axis of the lens, and a parallelism of the image pickup surface of the lens are adjusted.

SUMMARY OF THE INVENTION

According to the present invention, an electronic image pickup apparatus includes an image forming optical system which forms an image of an object, which includes a plurality of lens units, and an image pickup element which includes an image pickup surface which converts the image formed by the image forming optical system, to an electric signal, and the image forming optical system includes a lens unit nearest to object side which is disposed nearest to an object side, an aperture stop which is disposed on an image side than the lens nearest to object side, and an image-side lens unit which is disposed on the image side than the aperture stop, and the lens unit nearest to object side includes a lens having a mark formed on an effective area of a lens surface thereof, and at least any one of the lens in the image forming optical system is held such that, a shifting or a tilting of the lens can be adjusted, and the electronic image pickup apparatus further includes a correction parameter storage section which stores correction parameters for correcting an unevenness of brightness due to the mark, and a signal processing section which corrects the unevenness of brightness due to the mark of which, an image has been picked up by the image pickup element, based on the correction parameter which has been stored in the correction parameter storage section.

BRIEF DESCRIPTION OF THE DRAWINGS

FIG. 6 is a diagram showing contents of a table of correction parameters in a state in which, an amount of shift of a lens is 0 and an amount of tilt of the lens is 0;

FIG. 7 is a diagram showing contents of a table of correction parameters in a state in which, the amount of shift of the lens is the maximum, and the amount of tilt of the lens is 0;

FIG. 8 is a diagram showing contents of a table of correction parameters in a state in which, the amount of shift of the lens is 0, and the amount of tilt of the lens is the maximum;

FIG. 9 is a diagram showing contents of a table of correction parameters in a state in which, the amount of shift of the lens is the maximum, and the amount of tilt of the lens is the maximum;

DETAILED DESCRIPTION OF THE PREFERRED EMBODIMENTS

Exemplary embodiments of an electronic image pickup apparatus according to the present invention will be described below in detail by referring to the accompanying diagrams. However, the present invention is not restricted to the embodiments described below.

(First Embodiment)

Figure 1A:
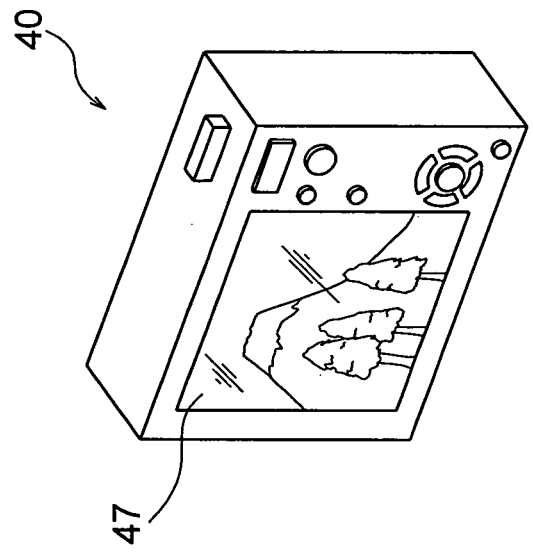
FIG. 1A is a front perspective view showing an outward appearance of a digital camera 40 according to a first embodiment of the present invention.
Figure 1B:
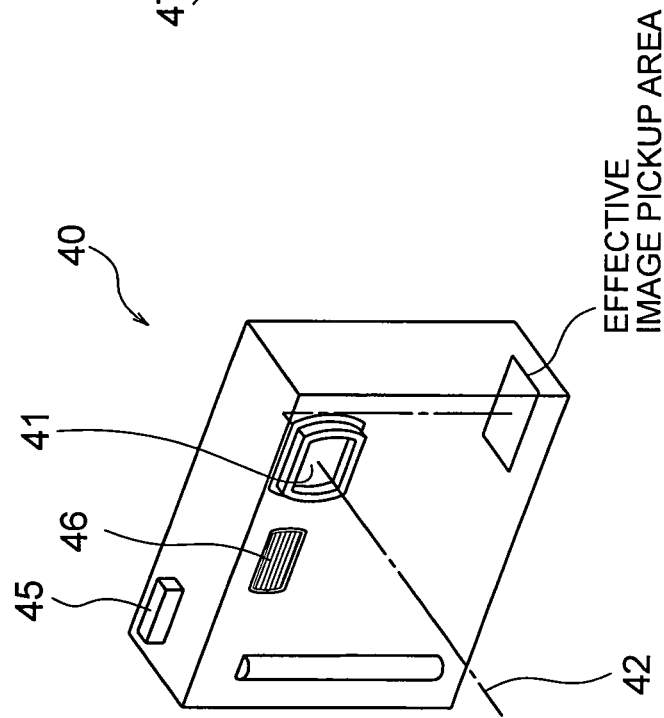
FIG. 1B is a rear perspective view showing an outward appearance of the digital camera 40.

FIG. 1A is a front perspective view showing an outward appearance of a digital camera 40 according to a first embodiment of the present invention, and FIG. 1B is a rear perspective view showing an outward appearance of the digital camera 40. In a case of this example, a photographic optical system 41 having an optical path for (photographic optical path 42 includes a shutter button 45, a flash 46, and a liquid-crystal display monitor 47. When the shutter button 45 disposed on an upper portion of the digital camera 40 is pressed, in conjunction with the pressing of the shutter button 45, an image is captured through the photographic optical system 41 such as a zoom lens according to the embodiments which will be described later.

An object image which has been formed by the photographic optical system 41 is formed on an image pickup surface of a CCD (charge coupled device) 149 (FIG. 3) via a near-infrared cut filter and an optical low-pass filter F. The filter F may not be provided with a low-pass function. The object image which is received at the CCD 149 is displayed as an electronic image on the liquid-crystal display monitor 47 provided on a rear surface of the digital camera 40 via a processing unit. Moreover, a recording unit is connected to the processing unit, and it is also possible to record the electronic image which has been captured. The recording unit may be provided separately from the processing unit, or may be formed such that, recording by writing electronically is carried out by a recording medium such as a flexible disc, a memory card, and an MO (magnetic optical disc). Moreover, the digital camera may also be structured as a silver-salt camera in which, a silver-salt film, is disposed instead of the CCD 149.

Here, for instance, the photographic optical system 41 which is an image forming optical system is a zoom lens in which, distances between lens units change at the time of zooming from a wide angle end to a telephoto end.

A mark is formed on a lens. The lens on which the mark is formed has a mark extended in a radial direction, which is disposed at a position where, the mark is formed as an image on an image pickup surface, at the wide angle end, and a position where the mark is not formed as an image on the image pickup surface, at the telephoto end, and has a mark extended in the radial direction, which is disposed at a position where, the mark is formed as an image on the image pickup surface, both at the wide angle end and the telephoto end.

By forming such a mark, it is possible to achieve both an off-axis situation at the wide angle end and an off-axis situation at the telephoto end on the image pickup surface. As a result, a lens adjustment at both the wide angle end and the telephoto end becomes possible.

Figure 2A:
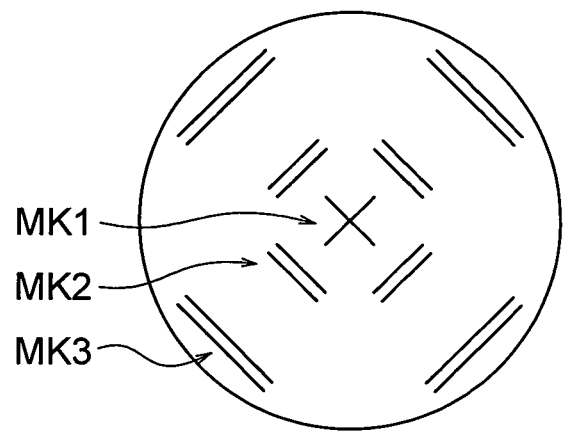
FIG. 2A is a diagram when a lens in a photographic optical system 41, on which marks are formed, is viewed from a front-surface side.

FIG. 2A is a diagram when the lens in the photographic optical system 41, on which the mark is formed, is viewed from a front-surface side.

The lens has a circular rotationally symmetric shape. A mark MK1 in the form of crossed lines is formed. In a radial direction inclined at 45°, marks MK2 and MK3, each as a set of two straight lines extended in a tangential direction, are formed.

By letting the mark to be two inclined lines, when blurred images are overlapped, a degree of decentering is revealed from an overlapping amount.

By observing an overlapping of blurring of two lines, a curved state and an inclined state of an image plane can be checked.

Figure 2B:
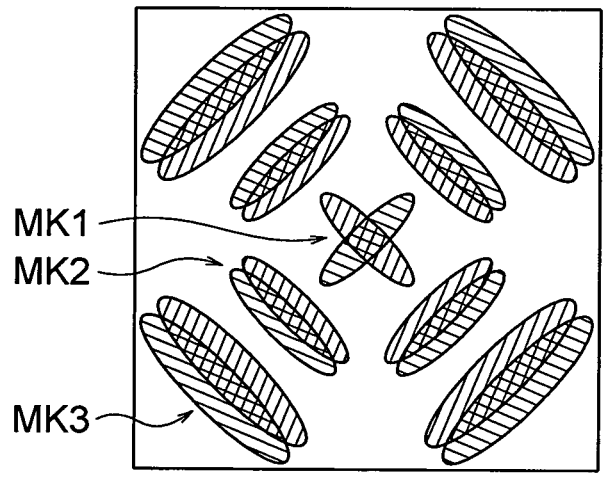
FIG. 2B is a diagram showing an image of marks when an object is captured with a zoom lens which is the photographic optical system 41, at a wide angle end.

FIG. 2B is a diagram showing an image of marks when an object is captured by a zoom lens which is the photographic optical system 41, at the wide angle end. At this time, the object has been focused. Therefore, images of a mark MK1, a mark MK2, and a mark MK3 in the form of straight lines are picked in a state of being out of focus.

Figure 2C:
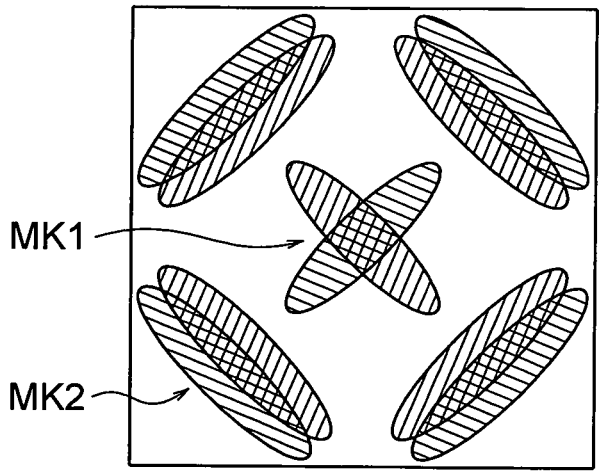
FIG. 2C is a diagram showing an image of marks when the object is captured by the zoom lens which is the photographic optical system 41, at a telephoto end.

FIG. 2C is a diagram showing an image of marks when the object is captured by the zoom lens which is the photographic optical system 41, at the telephoto end. At this time, the object has been focused. Therefore, images of a mark 1, a mark 2, and a mark 3 are picked up in a state of being out of focus, or in other words, in a blurred state.

Moreover, images of the mark MK1, the mark MK2, and the mark MK3 are to be picked up by the CCD 149 which is an image pickup element. Accordingly, it is possible to check a state of a curvature of field and a state of a decentration aberration of the overall zoom lens.

The marks are not restricted to be of straight lines, and may have a circular shape as well.

Moreover, in FIG. 2A, a distance between the two lines in one set corresponds to a degree of decentration aberration which enables to check the degree of decentration aberration. When the distance between the two lines is changed, overlapping of blurred images (portion in which inclined lines are overlapped) in FIG. 2B and FIG. 2C changes. Moreover, when the degree of decentration aberration is to be increased, it is desirable to form a mark having a substantial overlapping of the blurred images.

Based on the image on the image pickup surface, the lens which is shiftably or tiltably held is to be moved. Accordingly, an adjustment of an image plane becomes possible.

Figure 10:
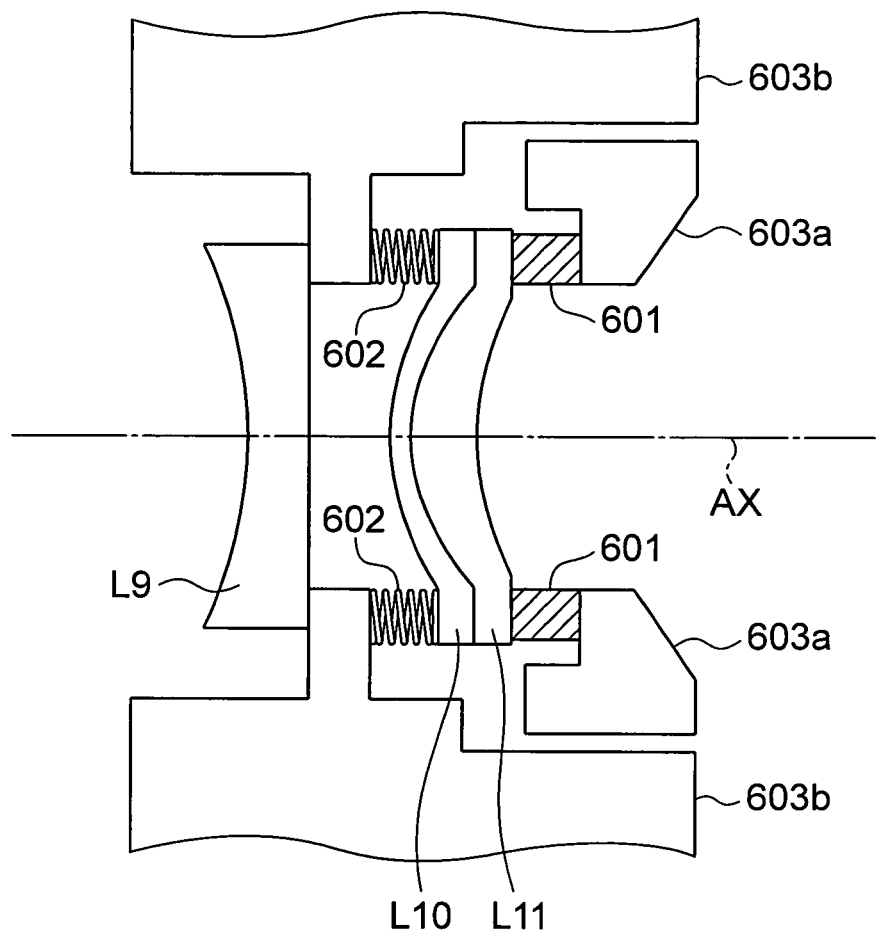
FIG. 10 shows a cross-sectional view of a holding frame which holds a cemented lens.

'Shift (shifting)' means a movement of a lens or a lens unit in a direction perpendicular to an optical axis AX (FIG. 10). Moreover, 'tilt (tilting)' means an inclination of a lens or a lens unit in a plane perpendicular to the optical axis AX. Here, 'tilt' does not include a movement in a direction along the optical axis AX, or a so-called movement of focusing.

A concrete arrangement and procedure for shifting and/or tilting a lens will be described later. Moreover, a concrete example of as to which lens from among the plurality of lenses in the zoom lens is to be shifted and/or tilted will also be described later.

Moreover, forming a mark additionally not on a lens but on a filter etc. is also to be taken into consideration. In this case, there is a possibility of decentering between an optical system and the mark. However, it is possible to take out an element of decentering only of a lens system by forming a mark on the lens system as in the first embodiment.

Depending on a purpose of photography, sometimes the decentration aberration and curvature of field are to be caused intentionally. In this case, the lens is to be shifted or tilted while observing the state of the mark MK1, the mark MK2, and the mark MK3. Accordingly, it is possible to achieve an effect of desired decentration aberration and curvature of field.

When a mark is formed on a lens near an aperture stop, it is difficult to identify the image at the image pickup surface. Therefore, it is preferable to dispose a lens on which a mark is formed in a lens unit nearest to object side, at a position away from the aperture stop.

In the first embodiment, for reducing a trouble of removing a member on which the mark is formed, from the optical system, the mark is formed on a lens in the optical system.

Therefore, as it has been shown in the abovementioned FIG. 2B and FIG. 2C, the mark MK1, the mark MK2, and the mark MK3 made on the lens are projected as blurred images on the image pickup surface even at the time of normal capturing.

Therefore, it is desirable to correct a reduction in brightness and an unevenness of brightness due to the blurred images of the marks. In the first embodiment, by a signal processing in which, correction parameters are used, a correction to eliminate an effect of blurred images of the marks it carried out.

Therefore, it is possible for a user to carry out an adjustment of the optical system using an image of a blurred mark on the image pickup element, and to carry out photography in which the effect of the mark has been corrected.

(Internal Circuit Structure)

Figure 3:
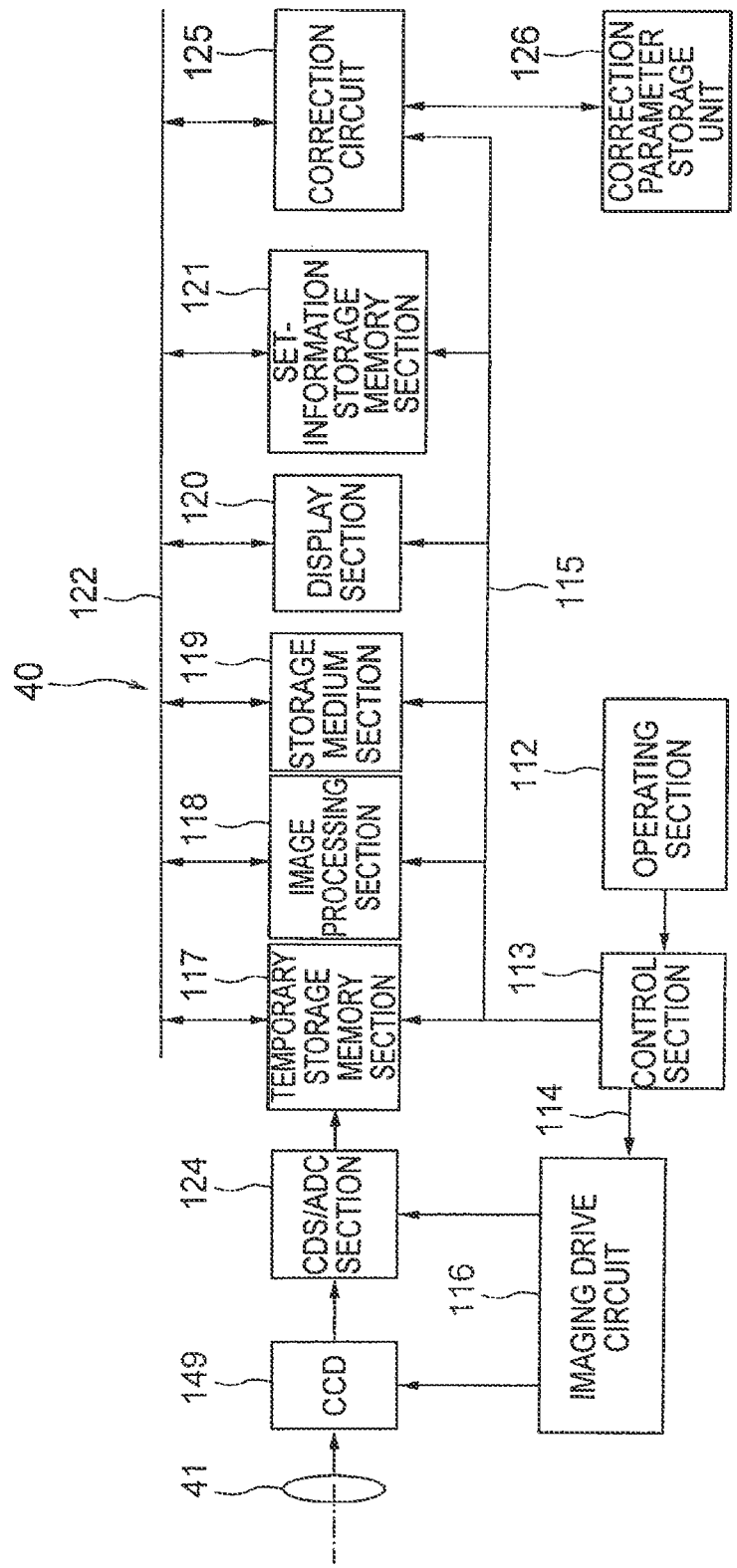
FIG. 3 is a structural block diagram of an internal circuit of main sections of the digital camera 40.

FIG. 3 is a structural block diagram of an internal circuit of main components of the digital camera 40. In the following description, the processing means described above includes for instance, a CDS/ADC section 124, a temporary storage memory 117, and an image processing section 118, and a storage means consists of a storage medium section 119 for example.

As shown in FIG. 3, the digital camera 40 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 40 upon receiving instructions and commands input by the user of the camera via the operating section 112, according to a computer program stored in this computer program memory.

The CCD 149 receives as light an object image which is formed via the photographic optical system 41 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 40 structured in such manner has the photographic optical system 41, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

The digital camera 40 includes a correction circuit 125 (a shading correction section, a distortion correction section, and a noise correction section which will be described later) which corrects electrically an image picked up by the CCD (image pickup element) 149.

The correction circuit 125 has a correction parameter storage unit 126 (corresponds to a shading correction parameter storage section and a shading correction parameter calculating section) which stores parameters for brightness correction at different positions on the image pickup surface due to the blurred image of the mark.

Accordingly, it is possible to correct by image processing an exposure difference which differs at various positions on the image pickup surface due to the blurred image of the mark, and to achieve a favorable image.

Furthermore, the correction parameter storage unit 126, taking into account the exposure difference which differs at various positions on the image pickup surface due to the blurred image of the mark which changes according to a change in zooming of a zoom lens and an aperture area of the aperture stop, stores correction parameters which differ at various positions on the image pickup surface due to the blurred image of the mark corresponding to the respective state.

Accordingly, correction is possible according to the exposure difference which differs at various positions on the image pickup surface due to the blurred image of the mark which changes according to the state of the zoom lens, and therefore it is preferable.

Apart from this, in order to correct the change in the image which differs at various positions on the image pickup surface due to the blurred image of the mark, it is preferable to carry out correction of noise at the time of shading correction.

Moreover, it is preferable to carry out correction in which, the change in the image at various positions on the image pickup surface due to the blurred image of the mark according to a photometric area and a focusing area has been taken into consideration.

An arrangement may be made such that, an image processing is carried out in advance to reduce an effect due to the change in the image which differs at various positions on the image pickup surface due to the blurred image of the mark, and thereafter, an image conversion of a filter effect due to the image processing, is carried out.

As a method of generating a shading correction parameter, a flat surface of white color with uniform brightness is to be captured, and a shading distribution which occurs is to be subjected to an inverse operation, and (the shading distribution subjected to inverse operation) can be stored as a correction parameter.

For example, in a case of letting a reciprocal (an inverse number) of a ratio of brightness of corresponding pixels with respect to a brightness of a center in a captured image to be a correction parameter, when the brightness in an arbitrary pixel A with respect to the brightness corresponding to a pixel at the center of the captured image is ½ (difference with the center is −1 EV), and the brightness in an arbitrary pixel B with respect to the brightness corresponding to the pixel at the center of the captured image is ¼ (difference with the center is −2 EV), the correction parameter becomes 1 (+0 EV) at the center, 2 (+1 EV) for the pixel A, and 4 (+2 EV) for the pixel B.

Moreover, by multiplying a value of brightness of each pixel by the correction parameter corresponding to each pixel, it is possible to carry out shading correction with high accuracy.

In other words, it is possible to correct brightness reduction due to the mark.

When flat surfaces of red (R), green (G), and blue (B) color having uniform brightness are captured, and correction parameters which correct a shading tendency of each color component of the image pickup element is generated, it is possible to carry out correction of chromatic shading with high accuracy.

A wide range of variations of ways of calculating the shading-correction parameter and correction operations is possible.

For example, for correcting shading which differs at various positions on the image pickup surface due to a blurred image of a mark, the number of parameters becomes large. Therefore, when correction parameter tables are stored for various states of the zoom lens, a storage capacity of storing the correction parameters becomes excessive.

Therefore, the shading correction parameters are to be divided into three types, and a correction parameter for a certain photographic state is to be found by an operation such as multiplication and summing. Accordingly, since it is possible to reduce a capacity of memory, it is preferable.

For instance, parameters are to be stored upon dividing into parameter data which is rotationally symmetric (correction parameters which depend on an image height) and parameter data which is non-rotationally symmetric (parameters which depend on a position in a direction of a short side of the image pickup surface and parameters which depend on a position in a direction of a long side of the image pickup surface). An arrangement may be made such that, a correction parameter of each pixel is calculated by addition or multiplication of respective parameter data.

Moreover, for correcting electrically the shading tendency which changes according to a focal length, an F number, and a focusing state of the zoom lens, a correction parameter distribution corresponding to a limited plurality of states (or the distribution is a correction parameter which can be subjected to operation) is to be stored.

Furthermore, an arrangement may be made such that the correction parameter in an arbitrary state is calculated by interpolation of the plurality of parameter distributions from among the parameter distributions which have been stored or subjected to operation.

When the shading at different positions on the image pickup surface due to the blurred image of mark is to be corrected electrically, there is an occurrence of noise of distribution which differs according to the position on the image pickup surface due to the blurred image of the mark. Therefore, an arrangement may be made such that noise correction parameter is imparted at different positions on the image pickup surface due to the blurred image of the mark, and the noise which occurs at different positions on the image pickup surface due to the blurred image of the mark is also to be corrected.

Moreover, it is also possible to enjoy photography in which, full use of shading is made. For example, a switch for switching to ON and OFF of the shading correction is to be provided. When the shading correction is ON, the shading at different positions on the image pickup surface due to the blurred image of the mark is to be corrected. When the shading correction is OFF, the shading is not to be corrected.

Moreover, when a flash photography is carried out, the shading at different positions on the image pickup surface due to the blurred image of the mark is susceptible to be conspicuous due to an effect of light distribution characteristics of a stroboscope.

Therefore, an arrangement may be made such that shading correction parameters at the time of setting off the strobe are stored as a separate table, and a correction parameter to be multiplied with each pixel is calculated by multiplying the shading correction parameter of the optical system by the shading correction parameter at the time of setting off the strobe.

Or the light distribution characteristics may be let to be strobe light distribution characteristics which become bright at different positions on the image pickup surface due to the blurred image of the mark in order to correct the shading by the zoom lens.

(Examples of Shading Correction)

An example in which, a shading correction parameter storage section, a shading correction parameter calculating section, a shading correction section, a noise correction parameter calculating section, a noise correction section, and a distortion correction section are used will be described below.

An apparatus which carries out shading correction will be described below by referring to diagrams from FIG. 4 to FIG. 9.

Figure 4:
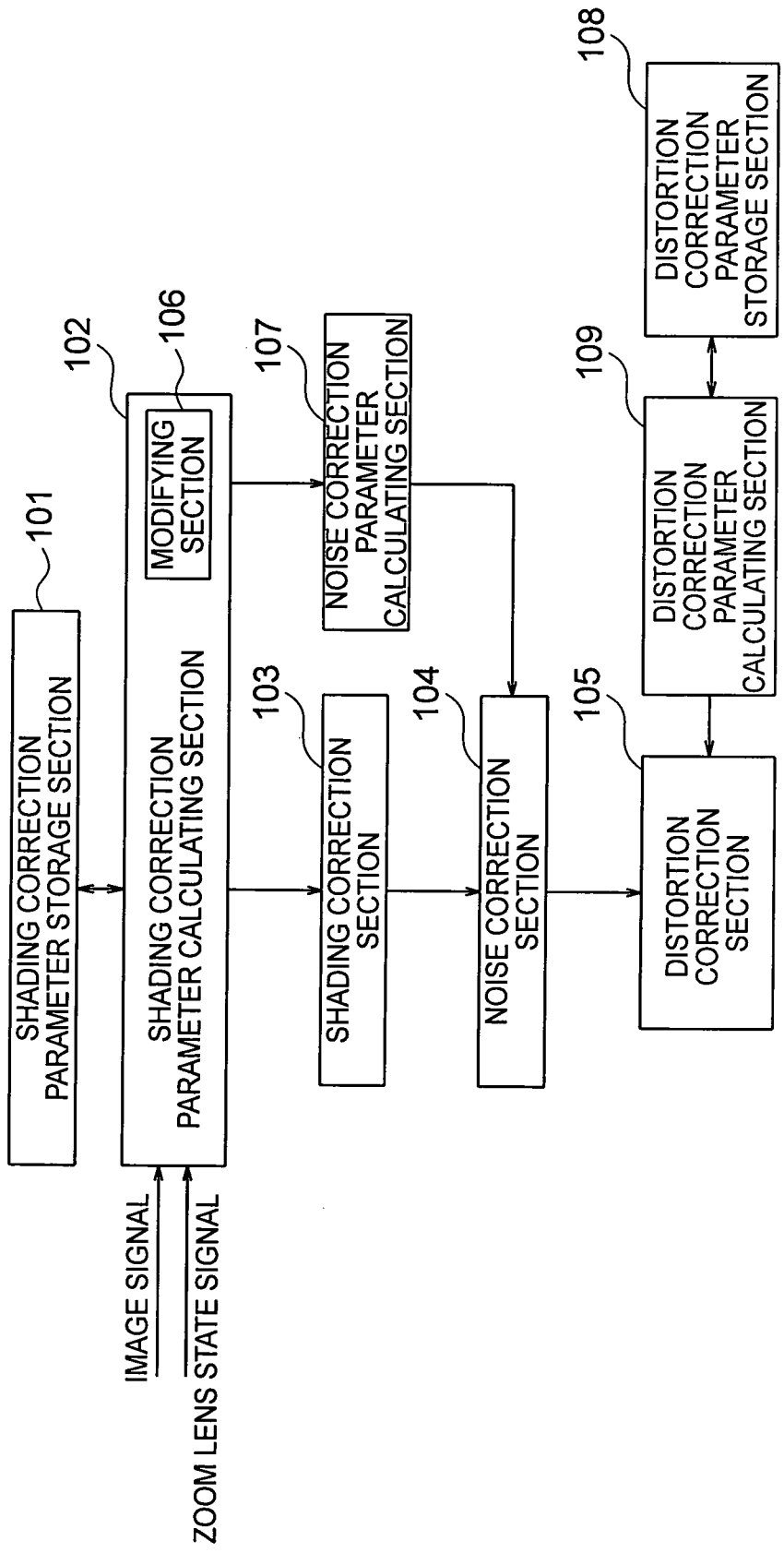
FIG. 4 is a diagram showing functional blocks of an image pickup apparatus.

FIG. 4 is a diagram showing functional blocks of the image pickup apparatus.

A shading correction parameter storage section 101, as an arrangement for correcting the shading electrically, stores shading correction parameters which differ at various positions on the image pickup surface due to the blurred image of the mark, for correcting the shading at different positions on the image pickup surface due to the blurred image of the mark of the zoom lens.

A shading correction section 103 carries out correction operation of an image which has been picked up by the image pickup element, based on the correction parameters of shading which have been stored in the shading correction parameter storage section 101.

A shading correction parameter calculating section 102 reads correction parameters from the shading correction parameter storage section 101.

An image signal and a zoom lens state signal are input to the shading correction parameter calculating section 102.

Shading correction parameter distribution is to be calculated such that it becomes an inverse function of shading characteristics which change according to the state of the zoom lens.

Moreover, the shading correction parameter calculating section 102 transmits the shading correction parameter distribution which has been calculated, to the shading correction section 103.

The shading correction parameter calculating section 102, which corresponds to a signal processing section, reads a correction parameter from the shading correction parameter storage section 101 which corresponds to a correction parameter storage section, according to at least any one of a zoom state, a focusing state, a shifting state, a tilting state, and an aperture value.

Next, the shading correction parameter calculating section 102, which corresponds to the signal processing section, calculates a correction parameter of an intermediate state from an interpolation operation based on the correction parameters in the plurality of states.

Moreover, the shading correction parameter calculating section 102 includes a shading correction parameter modifying section 106.

The shading correction parameter modifying section 106 carries out an interpolation operation (such as a method of least squares) for calculating the correction parameter distribution in the states of the zoom lens which have not been stored in the correction parameters in the shading correction parameter storage section 101.

The correction parameter distribution which has been calculated by the shading correction parameter calculating section 102 is sent to the shading correction section 103, and is also transmitted to a noise correction parameter calculating section 107.

The shading correction section 103 carries out multiplication of the brightness and the correction parameter for each pixel of the image captured. Accordingly, the shading correction section 103 generates an image for which, the shading correction has been carried out.

The noise correction parameter calculating section 107 calculates noise correction parameter distribution based on the distribution of the shading correction parameters.

An image signal which has been corrected by the shading correction section 103 is sent to the noise correction section 104. The noise correction section 104 makes a noise correction value high for the image signal from the shading correction section 103, in accordance with an area of a high value of the shading correction parameter (higher the value of the shading correction parameter for that area, higher is the noise correction value) based on a parameter having a noise correction parameter distribution from the noise correction parameter calculating section 107.

The image signal which has been subjected to noise correction in the noise correction section 104 is sent to a distortion correction section 105. The distortion correction section 105 carries out image processing which corrects the distortion.

At this time, the distortion correction section 105 carries out arithmetic processing of the image signal to correct the distortion by using a correction parameter of the distortion corresponding to the state of the zoom lens. As a result, the distortion correction section 105 outputs an image signal having the distortion corrected.

A distortion correction parameter storage section 108 stores basic correction parameters based on signals indicating the zoom lens state.

A distortion correction parameter calculating section 109 reads a plurality of correction parameters which are close to the corresponding zoom lens state, from the distortion correction parameter storage section 108.

Next, the distortion correction parameter calculating section 109 calculates the distortion correction parameter corresponding to the state of the zoom lens, by an operation such as interpolation of the plurality of parameters. A signal from the distortion correction parameter calculating section 109 is sent to the abovementioned distortion correction section 105.

The distortion correction section 105 corrects the distortion of the image based on the correction parameter.

It is not shown particularly in the diagram, but an image processing such as a process to emphasize color saturation and a process to reduce rotationally symmetric oblique incident light may be carried out as further image processing. The image signal which has been converted is displayed as an image on display sections 120 and 47, or is recorded in a recording medium.

By the abovementioned process, it is possible to correct the unevenness of brightness due to the mark.

Figure 5:
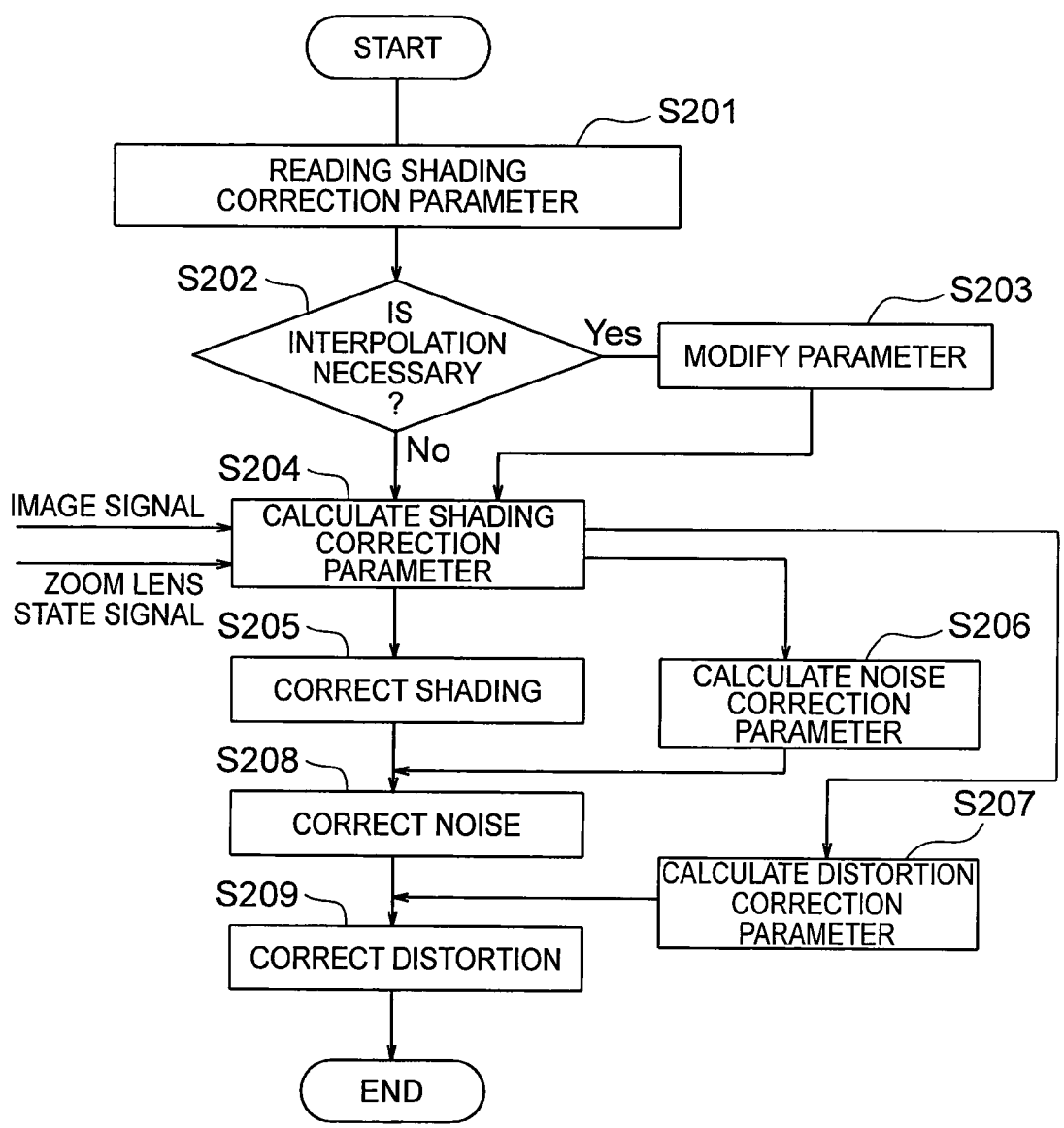
FIG. 5 is a flowchart showing a procedure for correcting shading, noise, and distortion.

FIG. 5 is a flowchart showing a procedure for correcting shading, noise, and distortion.

At step S201, the shading correction parameter calculating section 102 reads the shading correction parameters which are stored in the shading correction parameter storage section 101.

At step S202, the shading correction parameter calculating section 102 makes a judgment of whether or not it is necessary to interpolate the correction parameter. When a judgment result at step S202 is affirmative (Yes), the process advances to step S203.

At step S203, the shading correction parameter modifying section 106 carries out an interpolation operation (such as the method of least squares) for calculating the correction parameter distribution in the zoom lens states which have not been stored in correction parameters in the shading correction parameter storage section 101. Further, the process advances to step S204.

Even when the judgment result at step S202 is negative (No), the process advances to step S204. At step S204, the shading correction parameter calculating section 102 calculates the correction parameter distribution based on the image signal and the zoom lens state signal.

At step S205, the shading correction section 103 carries out correction of shading. Moreover, at step S206, the noise correction parameter calculating section 107 calculates the noise correction parameter distribution based on the correction parameter distribution which has been calculated.

At step S208, the noise correction section 104 makes the noise correction value high for the image signal from the shading correction section 103, in accordance with the area of the high value of the shading correction parameter, based on the parameter having noise correction parameter distribution from the noise correction parameter calculating section 107. Next, the noise correction section 104 carries out noise correction for the image.

At step S207, the distortion correction parameter calculating section 109 reads the plurality of correction parameters close to the corresponding zoom lens state, from the distortion correction parameter storage section 108. Further, the distortion correction parameter calculating section 109 calculates the distortion correction parameter corresponding to the state of the zoom lens, by an operation such as interpolation of the plurality of parameters.

At step S209, the distortion correction section 105 carries out arithmetic processing of the image signal to correct the distortion, by using the distortion correction parameter corresponding to the state of the zoom lens. As a result, the distortion correction section 105 outputs an image signal having the distortion corrected.

Next, parameters of shading correction will be described below in detail.

The shading correction parameter storage section 101 stores shading correction parameters for which, the distribution becomes a distribution differing at various positions on the image pickup surface due to the blurred image of the mark of the image pickup element which occurs due to the zoom lens.

Values of correction parameters may be values which are determined in advance by a method of calculating from an image taken of an object of a uniform brightness as described above, or by simulation by a computer.

The correction parameters stored in the shading correction parameter storage section 101 do not correspond to all pixels. The respective correction parameters are to be interpolated in the shading correction parameter calculating section 102. Accordingly, distribution of correction parameters corresponding to all pixels is to be calculated.

A set of correction parameters corresponding to one state of the zoom lens is called as a 'table'.

FIG. 6, FIG. 7, and FIG. 8 are diagrams showing contents of tables of correction parameters. A table which is to be stored in the shading correction parameter storage section 101 is a combination of the following states (1), (2), and (3).

(1) Three states namely, a zooming state at a wide angle end, a zooming state in an intermediate focal length state, and a zooming state at a telephoto end respectively, (2) Two states namely, a focusing state when focused to an object at infinity and a focusing state when focused to an object at a close distance, and (3) Two state namely, an aperture state when aperture is open and an aperture state when aperture is minimum.

FIG. 6 is a diagram showing contents of a table of correction parameters in which, an amount of shift of a lens is 0 and an amount of tilt of the lens is 0. Tables from table 1a to table 12a are stored in the shading correction parameter storage section 101.

FIG. 7 is a diagram showing contents of a table of correction parameters in a state in which, the amount of shift of the lens is the maximum, and the amount of tilt of the lens is 0. Tables from table 1b to table 12b are stored in the shading correction parameter storage section 101.

FIG. 8 is a diagram showing contents of a table of correction parameters in a state in which, the amount of shift of the lens is 0, and the amount of tilt of the lens is the maximum. Tables from table 1c to 12c are stored in the shading correction parameter storage section 101.

FIG. 9 is a diagram showing contents of a table of correction parameters in a state in which, the amount of shift of the lens is the maximum, and the amount of tilt of the lens is the maximum. Tables from table 1d to table 12d are stored in the shading correction parameter storage section 101.

Therefore, tables in combinations of all states, which are three states×two states×two states=12 states are to be stored in the shading correction parameter storage section 101. The number of tables may be increased according to a zoom ratio of the zoom lens.

The shading correction parameter calculating section 102 carries out calculation of shading correction parameters corresponding to pixels which are arranged two-dimensionally on a flat surface of the image pickup element, based on the shading correction parameters of the shading correction parameter storage section 101.

In the calculation of the shading correction parameters, shading correction coefficients corresponding to pixels which have not been stored in advance are subjected to a linear interpolation, a non-linear interpolation, or an interpolation by the method of least squares.

When the state of the zoom lens does not exist in the table which has been stored in advance, the shading correction parameter calculating section 102 reads a plurality of tables close to the state of that zoom lens. Moreover, the shading correction parameter modifying section 106 calculates by carrying out by weighting corresponding to the state of the zoom lens. Accordingly, a shading correction parameter corresponding to the state of the zoom lens at the time of capturing is calculated.

To cite an example of the shading correction parameter which is to be calculated, a correction parameter of each pixel is determined based on X, Y coordinates of each pixel, when converted to the abovementioned polynomial.

The shading correction section 103 extracts a shading correction coefficient related to the corresponding pixel from among the shading correction parameters which have been calculated by the shading correction parameter calculating section 102. Moreover, the shading correction section 103 carries out correction operation by using the shading correction coefficients, for brightness data which has been selected from the pixels of the image pickup element.

Next, an arrangement for shifting and tilting a lens and a control procedure will be described below.

Figure 14A:
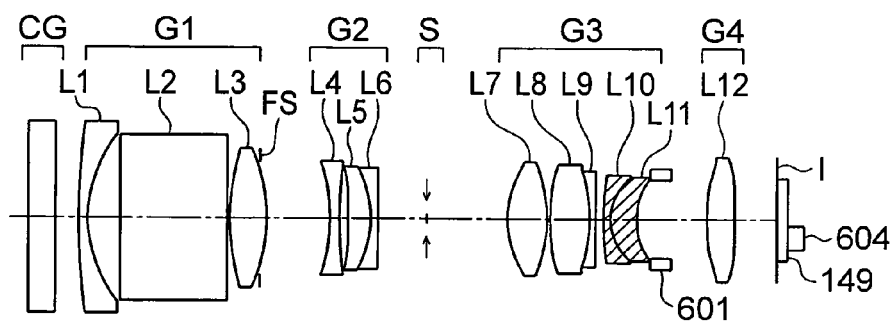
FIG. 14A is a diagram showing a cross-sectional view of an image forming optical system according to the first embodiment of the present invention.

To start with, FIG. 14A is a diagram showing a lens cross-sectional view of an image forming optical system in an electronic image pickup apparatus according to the first embodiment of the present invention. Here, a mark is formed on an object-side surface of a lens L1. Moreover, a cemented lens of a lens L10 and a lens L11 shown with oblique lines is shiftably and tiltably held.

The description will be continued by returning back to FIG. 10. FIG. 10 shows a cross-sectional view of a holding frame which holds the cemented lens of the lens L10 and the lens L11.

One end of an adjusting portion 601 is held by a holding frame 603a, and the other end thereof makes a contact with an area other than an effective area of the cemented lens which is movable. Furthermore, an elastic member 602 which is disposed on an opposite side of the adjusting portion 601 with respect to the cemented lens which is movable, and which exerts an external force to the cemented lens in a direction in which a length of the adjusting portion 601 changes is provided. A member such as a coil spring can be used as the elastic member 602.

Lenses other than a lens 9 and the lens 10 are also held and fixed in a holding frame 603b. Here, for the adjusting portion 601, a motor such as a stepping motor and a voice coil motor (VCM) can be used.

The cemented lens is to be supported by a so-called cantilever. By driving the adjusting portion 601, it is possible to tilt the cemented lens.

Figure 11:
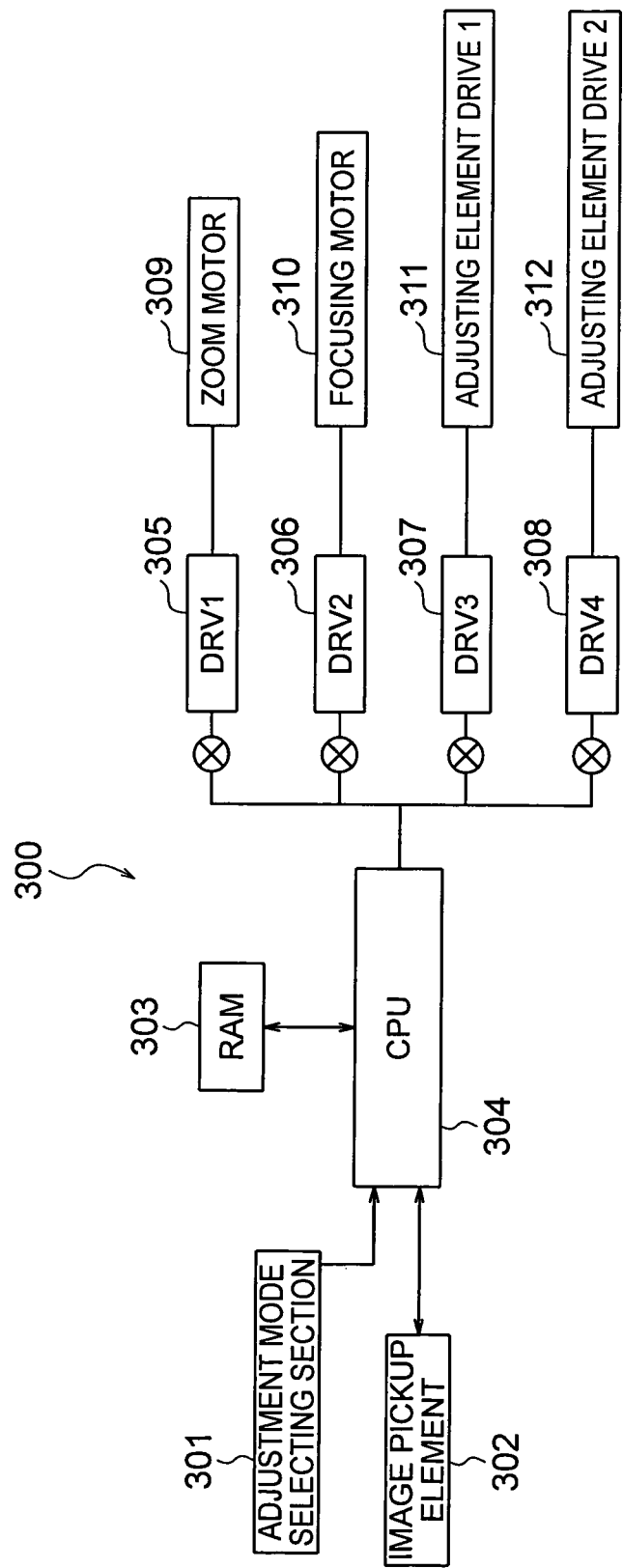
FIG. 11 shows functional blocks related to a drive of a lens according to the first embodiment.

FIG. 11 shows functional blocks related to a drive of a lens according to the first embodiment. A user inputs information such as the following information from an adjustment mode selecting section 301. A jog dial can be used for the adjustment-mode selecting section 301.
(1) Simple zero-point adjustment
(2) Information of tilting an image plane
(3) Curvature rate of field
(4) Tilt information
(5) Field-tilt information For instance, by varying an image plane tilt rate, it is possible to make a 'field-tilt photography mode'. Moreover, by varying a curvature rate of field, it is possible to make an 'aggressive photography mode'. Furthermore, for high amateur photographers, it also possible to let to change an adjustment coefficient of the image plane tilt and the curvature of field manually. Accordingly, it is possible to further widen a range of variety of photographs captured by a digital camera.

Information of an adjustment mode is sent to a CPU (central processing unit) 304. An image pickup element 302 and a RAM (random access memory) 303 are connected to the CPU 304. Correction parameters and initial values at the time of shipment from factory are stored in the RAM 303.

Following the procedure as described by the abovementioned flowchart, the CPU 304 calculates drive amount of a lens such as a zoom-drive amount, a focusing-drive amount, an amount of shift and tilt at the wide angle end state, a shift-drive amount and a tilt-drive amount at the telephoto end state.

Control signals from the CPU 304 are output to drivers 305, 306, 307, and 308. The driver 305 drives a zoom motor 309. The driver 306 drives a focusing motor 310. The driver 307 drives a shift and tilt adjusting section 311 for the wide angle end. The driver 308 drives a shift and tilt adjusting section 311 for the telephoto end.

Next, a shift and/or tilt drive (appropriately called as 'adjustment drive') of a lens will be described below.

The zoom lens has a focal length state which is continuously variable from the wide angle state to the telephoto end state, via the intermediate focal length state. Moreover, it is possible to let differ the lens which carries out the abovementioned arrangement according to whether the overall zoom lens is at the wide angle end or at the telephoto end.

For example, in the wide angle end state, the image pickup element 302 is to be adjusted. Moreover, in the telephoto end state, a third lens unit L3 is to be adjusted.

It is also possible to make an arrangement such that, an amount of decentering when there is no decentration aberration and curvature of field is to be stored in the RAM 303, and when the mode is let to be '0 (zero) target mode', drawing out of lens to the wide angle end and the telephoto end is carried out automatically, and positions of the image pickup element and the adjusting lens are adjusted automatically, and the lens state is let to be the optimum with the full zoom state.

Figure 12:
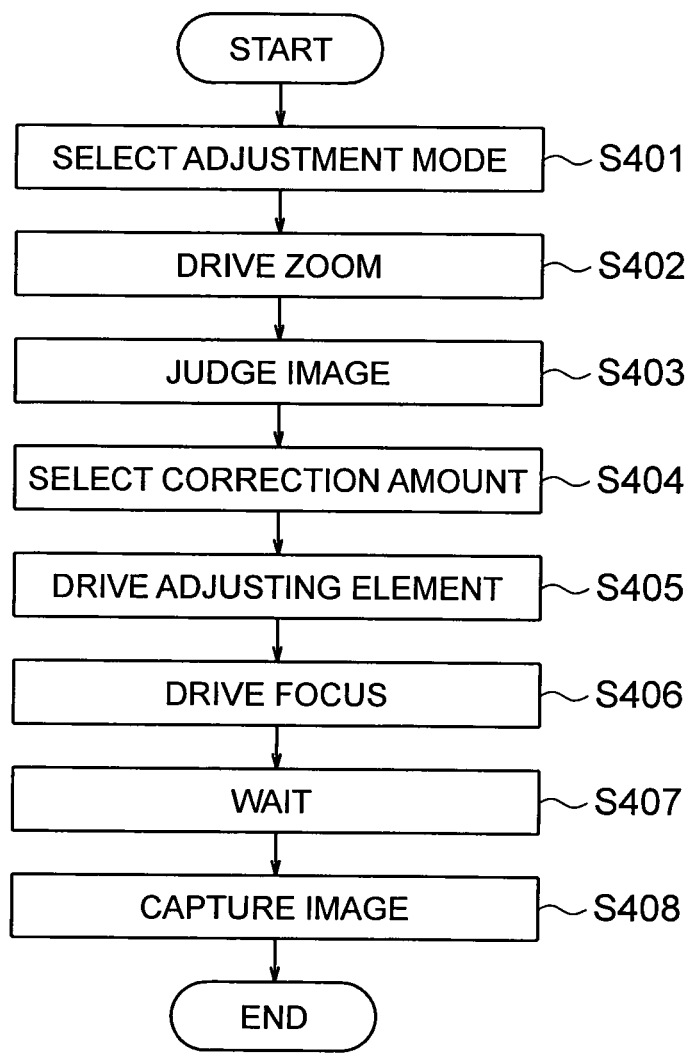
FIG. 12 is a flowchart showing a procedure when the functional blocks of the first embodiment are used.

FIG. 12 is a flowchart showing a procedure when the abovementioned functional blocks are used.

At step S401, the user selects an adjustment mode by using the adjustment mode selecting section 301.

At step S402, firstly, the zoom lens is driven to a desired focal length state. At step S403, the CPU 304, based on the image which has been picked up, makes a judgment of whether or not the lens for adjustment has attained the desired amount of shift and tilt. At step S404, the CPU 304 selects a correction amount appropriate for attaining the desired values. At step S405, the CPU 304 drives the necessary adjusting portion. A further detail procedure at step S405 will be described later by using FIG. 13.

At step S406, the CPU 304 carries out focusing. Accordingly, the object is focused. At step S407, the user waits till capturing. At step S408, an image is captured with the required capturing conditions.

Figure 13:
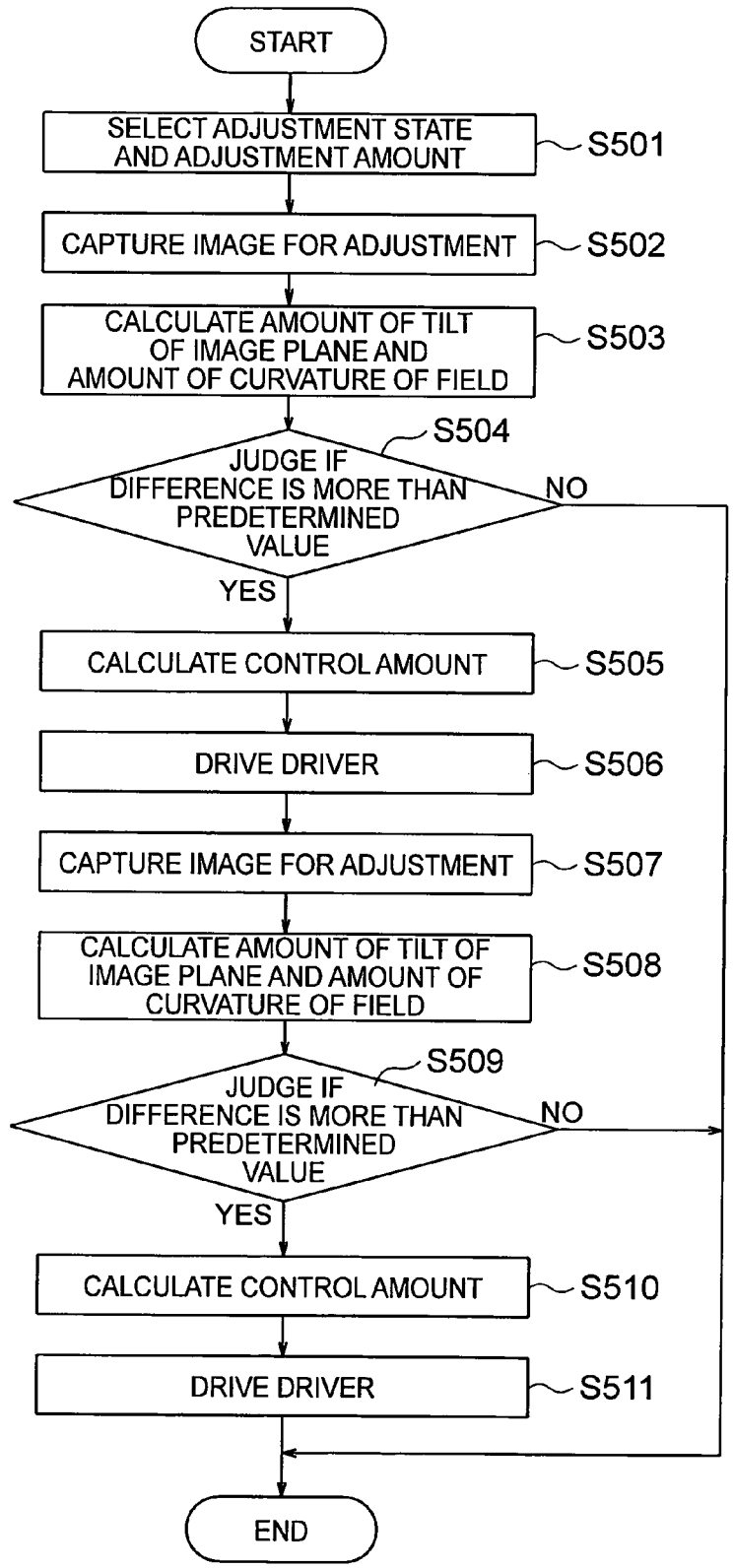
FIG. 13 is a flowchart showing a detail procedure of an adjustment mode.

FIG. 13 is a flowchart showing further the detail procedure of the adjustment mode. At step S501, the user sets the desired adjustment state and adjustment amount by using the adjustment mode selecting section 301. The adjustment state is a state such as a decentration aberration state and a field-tilt state. The adjustment amount is an amount such as a degree of decentration aberration and an amount of field tilt.

At step S502, by capturing an object having a uniform brightness, an image for adjustment which is marked, is captured. At step S503, the CPU 304 calculates an amount of tilt of an image plane and an amount of curvature of field. At step S504, the CPU 304 compares a calculated value and an initial value, and makes a judgment of whether or not the difference is more than a predetermined value.

When a judgment result at step S504 is negative (No), the adjustment mode is terminated. When the judgment result at step S504 is affirmative (Yes), the process advances to step S505. At step S505, the CPU 304 calculates a control amount of the drivers 307 and 308 such that the desired lens adjustment value is achieved.

At step S506, the lens adjustment is carried out by driving the drivers 307 and 308. At step S507, the image for adjustment is captured once again. At step S508, the CPU 304 calculates the amount of tilt of image plane and the amount of curvature of field in the image captured. At step S509, the CPU 304 compares a calculated value and an initial value, and makes a judgment of whether or not the difference is more than the predetermined value.

When a judgment result at step S509 is negative (No), the adjustment mode is terminated. When the judgment result at step S509 is affirmative (Yes), the process advances to step S510. At step S510, the CPU 304 calculates the control amount of the drivers 307 and 308 such that the desired lens adjustment value is achieved.

At step S511, the lens adjustment is carried out by driving the drivers 307 and 308. By executing step S509, it is possible to carry out a second judgment (secondary judgment) of whether or not the desired mode is assumed at the time of capturing.

Only the judgment at step S504 is also sufficient. In this case, by executing further step S509, it is possible to set the optical system to the desired mode correctly.

Next, an image forming optical system and an image pickup element in the electronic image pickup apparatus according to the first embodiment will be described below. Image forming optical systems in all the following embodiments have an image forming optical system which forms an image of an object, and an image pickup apparatus which has an image pickup surface I which converts an image formed by the image forming optical system, to an electric image.

Moreover, the image forming optical system includes
a lens unit nearest to object side which is disposed nearest to an object side,
an aperture stop S which is disposed on an image side than the lens unit nearest to object side, and
an image-side lens unit which is disposed on the image side than the aperture stop S.

In all the embodiments which will be described below, a lens cross-sectional view in an intermediate focal length state is shown. Moreover, a lens for adjustment is shown by oblique lines.

However, as it has been mentioned above, setting by the lens adjustment and the CCD adjustment can be carried out for any focal length state from the wide angle end state to the telephoto end state via the intermediate focal length state.

Moreover, the focusing in each case is to be carried out by moving a lens component nearest to the image side.

FIG. 14A is a diagram showing a cross-sectional view of an image forming optical system according to the first embodiment of the present invention.

The image forming optical system according to the first embodiment, includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

At least any one of lenses disposed on the image side than the lens unit nearest to object side is held such that, at least a shifting or a tilting of the lens can be adjusted.

Concretely, a cemented lens of a lens L10 and a lens L11 on an image-surface side of the third lens unit G3 is held via a adjusting portion 601 such that at least the shifting or the tilting of the cemented lens can be adjusted.

In the image forming optical system, it is possible to carry out zooming from the wide angle end to the telephoto end by changing distances between the lens units.

Furthermore, the image forming optical system has an intermediate lens unit which is disposed between the first lens unit G1 which is the lens unit nearest to object side, and the aperture stop S.

A mark is made on an effective area of a lens surface on the object side of a lens L1 in the first lens unit G1 which is the lens unit nearest to object side.

Here, it is possible to form the mark by black color. Accordingly, it is easy to identify the mark.

Moreover, it is preferable that a surface on which the mark is to be formed is a surface having the smallest absolute value of curvature in the lens component. This is because it is easy to form a mask on such surface. In this case, the lens component is let to be a lens body of only two surfaces of which, a refracting surface in contact with air in an optical path is an object-side surface, and the other surface is an image-side surface.

The first lens unit G1 which is the lens unit nearest to object side has at least a plurality of lens surfaces.

The mark is formed on an object-side lens surface of a lens component L1 which is nearest to the object side of the lens unit nearest to object side.

Accordingly, the mark being kept away from the aperture stop S, it is easy to carry out adjustment.

Moreover, the mark may be formed on an image-side surface (concave surface) of a negative lens L1 on the object side in the first lens unit G1.

When the surface on which the mark is to be formed is a surface nearest to the object side, sometimes, an image of the mask formed at the time of capturing is susceptible to be conspicuous. Particularly, when the image forming optical system is a zoom lens, since a diameter of an axial light beam becomes small at the wide angle end, the mark is susceptible to be conspicuous. Furthermore, even when image processing is carried out, noise is remarkable. For this reason, it is desirable that the surface on which the mark is to be formed is a surface on the image side than the lens surface nearest to the object side.

Moreover, the target of adjustment, at the wide angle end, in addition to the cemented lens of the lens L10 and the lens L11, may also be the CCD 149 which is the image pickup element. The CCD 149 is provided with an adjusting portion 604. The adjusting portion 604, similarly as the adjusting portion 601, has a mechanism which can adjust the shifting and the tilting of the image pickup element.

An image pickup element moving portion 604, which movably holds the CCD 149 which is the image pickup element, is provided.

The image pickup element moving portion 604 adjusts at least the shifting and tilting of the CCD 149 which is the image pickup element, at the wide angle end, and holds the CCD 149, to be fixed, at the telephoto end.

Accordingly, in the wide angle end state, the adjustment of the CCD 149 is to be carried out. Whereas, in the telephoto end state, since the adjustment of shifting and tilting of the CCD 149 is not to be carried out, the lens adjustment is to be carried out. In such manner, in the focal length state, the lens adjustment and the CCD adjustment are switched.

(Second Embodiment)

Figure 14B:
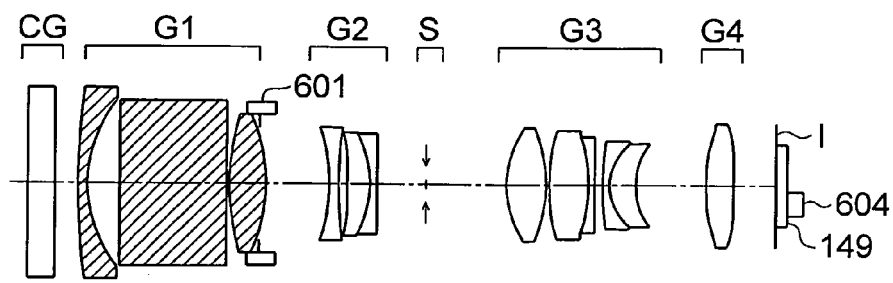
FIG. 14B is a diagram showing a cross-sectional view of an image forming optical system according to a second embodiment of the present invention.

FIG. 14B is a diagram showing a cross-sectional view of an image forming optical system according to a second embodiment of the present invention.

The image forming optical system according to the second embodiment includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

In this case, a mark is formed on an object-side surface of a lens L1. Moreover, the first lens unit G1 as a whole is held such that a shifting and a tilting can be adjusted. Furthermore, a CCD 149 is also held such that a shifting and a tilting can be adjusted.

In the second embodiment, instead of the first lens unit G1, the second lens unit G2 may be let to the adjusting lens.

(Third Embodiment)

Figure 15A:
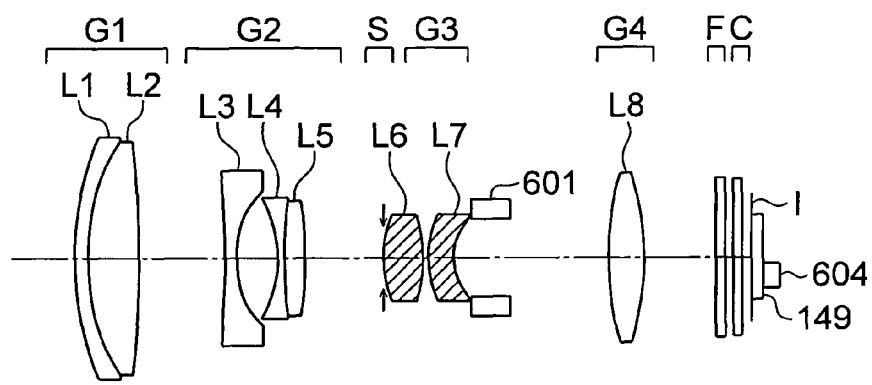
FIG. 15A is a diagram showing a cross-sectional view of an image forming optical system according to a third embodiment of the present invention.

FIG. 15A is a diagram showing a cross-sectional view of an image forming optical system according to a third embodiment of the present invention.

The image forming optical system according to the third embodiment includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

In this case, a mark is formed on an image-side surface of a lens L2. A lens L6 or a lens L7 in the third lens unit G3 is held such that a shifting or a tilting can be adjusted. Furthermore, a CCD 149 is also held such that a shifting or a tilting can be adjusted.

(Fourth Embodiment)

Figure 15B:
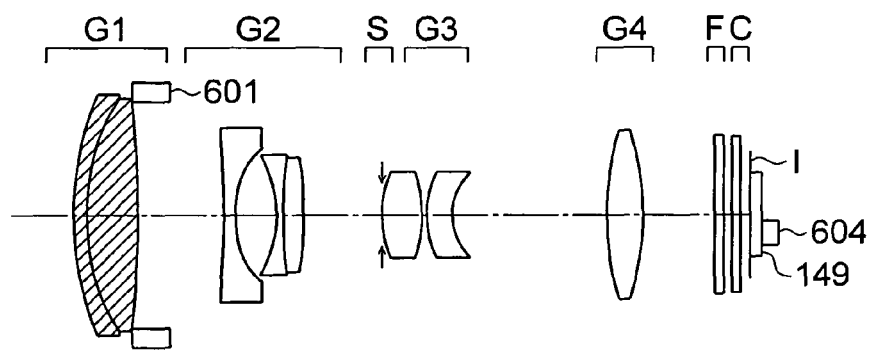
FIG. 15B is a diagram showing a cross-sectional view of an image forming optical system according to a fourth embodiment of the present invention.

FIG. 15B is a diagram showing a cross-sectional view of an image forming optical system according to a fourth embodiment of the present invention.

The image forming optical system according to the fourth embodiment includes in order from an object side, a first lens unit G1 having a positive refractive power, a second lens unit G2 having a negative refractive power, an aperture stop S, a third lens unit G3 having a positive refractive power, and a fourth lens unit G4 having a positive refractive power.

In this case, a mark is formed on an image-side surface of a lens L2. Moreover, the first lens unit G1 is held such that a shifting and a tilting can be adjusted. Furthermore, a CCD 149 is also held such that a shifting and a tilting can be adjusted.

(Fifth Embodiment)

Figure 16A:
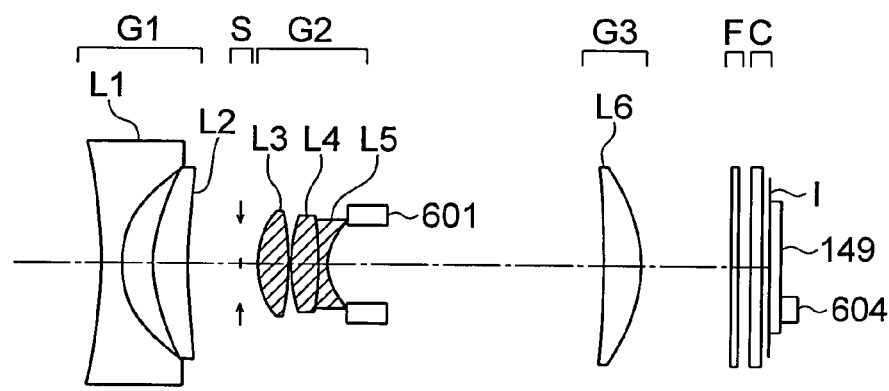
FIG. 16A is a diagram showing a cross-sectional view of an image forming optical system according to a fifth embodiment of the present invention.

FIG. 16A is a diagram showing a cross-sectional view of an image forming optical system according to a fifth embodiment of the present invention.

The image forming system according to the fifth embodiment includes in order from an object side, a first lens unit G1 having a negative refractive power, an aperture stop S, a second lens unit G2 having a positive refractive power, and a third lens unit G3 having a positive refractive power.

In this case, a mark is formed on an object-side surface of a lens L1. Moreover, a lens L3 or a cemented lens of a lens L4 and a lens L5 in the second lens unit G2 is held such that a shifting and a tilting can be adjusted. Furthermore, a CCD 149 is held such that a shifting and a tilting can be adjusted.

A lens near the aperture stop S has a high sensitivity. Consequently, by letting the lens L3 or the cemented lens to be the adjusting lens, it is possible to control the decentration aberration efficiently.

Figure 16B:
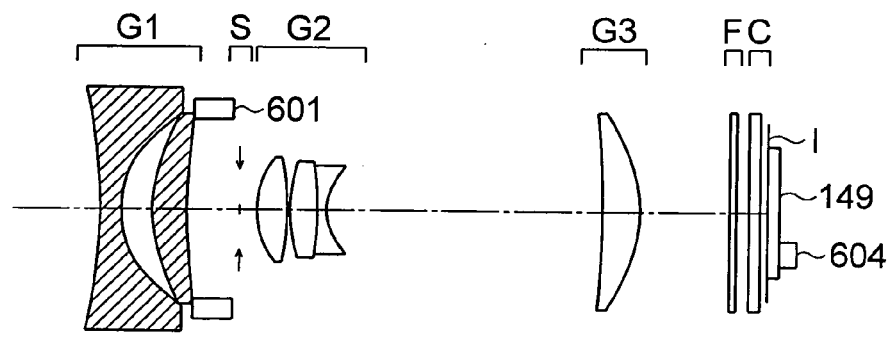
FIG. 16B is a diagram showing a cross-sectional view of an image forming optical system according to a sixth embodiment of the present invention.

FIG. 16B is a diagram showing a cross-sectional view of an image forming optical system according to a sixth embodiment of the present invention.

The image forming optical system according to the sixth embodiment includes in order from an object side, a first lens unit G1 having a negative refractive power, an aperture stop S, a second lens unit G2 having a positive refractive power, and a third lens unit G3 having a positive refractive power.

In this case, a mark is formed on an object-side surface of a lens L1. Moreover, the first lens unit G1 is held such that a shifting and a tilting can be adjusted. Furthermore, a CCD 149 is also held such that a shifting and a tilting can be adjusted.

According to the present invention which has been described above, it is also possible for the user to change arbitrarily the tilting of an image plane and the curvature of field which, generally, are determined when shipped (before shipment) from the factory. In this case, in a manufacturing process, since an accuracy of decentration adjustment is acceptable, it is possible to assemble the optical system at an arbitrary place. Therefore, it is possible to reduce a load of a manufacturing line remarkably.

Moreover, the image forming optical system according to the present invention has an adjustment mark on an arbitrary lens surface, and an arbitrary lens unit or lens has a mechanism which can be adjusted by an operation inside the camera. Therefore, the tilting of image plane and the curvature of field can be changed arbitrarily by the user.

In an optical system of a positive-lead type or a negative-lead type, a position of an adjusting lens unit changes. As an optimum zoom type, it is desirable to have a zoom lens in which, a lens unit in which the decentration is effective, and a lens unit in which the decentration is ineffective, are separated distinctly.

Here, it desirable that a lens which does not adjust has a low sensitivity and a lens which does adjust has a high sensitivity for reducing a range of movement.

In a case of an optical system of the positive-lead type, it is preferable that lens units are arranged in order of a positive lens unit, a negative lens unit, and an aperture stop or in order of a positive lens unit, a negative lens unit, a positive lens unit, and an aperture stop, and that a mark is formed on a positive lens nearest to object, farther away from the aperture stop.

Moreover, in a case of an optical system of the negative-lead type, it is preferable that lens units arranged in order of a negative lens unit, a positive lens unit, and an aperture stop, or in order of a negative lens unit and an aperture stop, and that a mark is formed on a negative lens nearest to the object side, farther away from the aperture stop.

Furthermore, since a tendency of the tilting of image plane and the curvature of field is to be judged for all combinations of the optical system, it is desirable to form a mark nearest to the object side.

Regarding the mark, for eliminating by image processing, it is desirable that the mark assumes a size of about one pixel of an image pickup element at an image forming position. Moreover, when the size of the mark is same as a size of about a few pixels collectively, the adjustment sensitivity becomes high but since a noise in image processing increases, it is not preferable.

In a case of a zoom lens, sensitivity of a lens unit which is decentered at the wide angle end and which is decentered at the telephoto end differs. From a point of focal depth, it is desirable that the lens unit which is decentered is near to an image-plane position.

Moreover, as a relative decentering of lens units which is related to a lens unit prior and next to the aperture stop at the wide angle end, has an effect on an image quality, it depends on each optical system.

Moreover, for calculating an adjustment amount of a lens unit correctly, a condition with less unevenness of peripheral brightness is preferable.

At the time of usual capturing, setting is made such that a mark is eliminated in image processing.

At the time of selecting adjustment, a mark which is formed as an image on a CCD is detected, and a tilt rate of image plane and a curvature rate of field are calculated, and a numeric conversion is displayed on an LCD.

The present invention can take various modifications which fairly fall within the basic teachings herein set forth.

As it has been described above, the present invention is useful for an electronic image pickup apparatus in which, it is possible to adjust a performance which is peculiar to a lens, while the overall system is small-size.

According to the present invention, an effective is shown that it is possible to provide an electronic image pickup apparatus in which, it is possible to adjust a performance which is peculiar to a lens, while the overall system is small-size.

What is claimed is:

1. An electronic image pickup apparatus comprising:
an image forming optical system which forms an image of an object, which comprises a plurality of lens units; and
an image pickup element which comprises an image pickup surface which converts the image formed by the image forming optical system, to an electric signal; where
the image forming optical system comprises
a lens unit nearest to object side which is disposed nearest to an object side,
an aperture stop which is disposed on an image side than the lens unit nearest to object side, and
an image-side lens unit which is disposed on the image side than the aperture stop, and
the lens unit nearest to object side comprises a lens having a mark formed on an effective area of a lens surface thereof, and
at least any one of the lens in the image forming optical system is held such that, a shifting or a tilting of the lens can be adjusted, and
the electronic image pickup apparatus further comprising:
a correction parameter storage section which stores correction parameters for correcting an unevenness of brightness due to the mark; and
a signal processing section which corrects the unevenness of brightness due to the mark of which, an image has been picked up by the image pickup element, based on the correction parameter which has been stored in the correction parameter storage section.

2. The electronic image pickup apparatus according to claim 1, wherein at least one of the lenses which have been disposed on the image side than the lens unit nearest to object side is held such that, a shifting or a tilting of the lens can be adjusted.

3. The electronic image pickup apparatus according to claim 1, wherein
the image forming optical system comprises an intermediate lens unit which is disposed between the lens unit nearest to object side and the aperture stop.

4. The electronic image pickup apparatus according to claim 1, wherein
the image forming optical system comprises in order from the object side:
the lens unit nearest to object side,
an intermediate lens unit,
the aperture stop, and
the image-side lens unit,
wherein
the lens unit nearest to object side has positive refractive power,
the intermediate lens unit has negative refractive power, and
the image-side lens unit has positive refractive power, and
the lens unit nearest to object side or the image-side lens unit is held such that, at least a shifting or a tilting thereof can be adjusted.

5. The electronic image pickup apparatus according to claim 1, wherein
the image forming optical system comprises in order from the object side:
the lens unit nearest to object side,
the aperture stop,
the image-side lens unit, and
a second image-side lens unit,
wherein
the lens unit nearest to object side has negative refractive power,
the image-side lens unit has positive refractive power, and
the second image-side lens unit has positive refractive power, and
the lens unit nearest to object side or the image-side lens unit is held such that, at least a shifting or a tilting thereof can be adjusted.

6. The electronic image pickup apparatus according to claim 1, wherein
the lens unit nearest to object side comprises at least a plurality of lens surfaces, and
the mark is formed on a lens surface of a lens component nearest to the object side in the lens unit nearest to object side.

7. The electronic image pickup apparatus according to claim 1, wherein
the image forming optical system, at the time of zooming from a wide angle end to a telephoto end, is a zoom lens in which, distances between lens units change, and
the lens on which, the mark is formed, comprises
a mark extended in a radial direction, which is disposed at a position where the mark is formed as an image on the image pickup surface, at the wide angle end, and a position where the mark is not formed as an image on the image pickup surface, at the telephoto end, and
a mark extended in the radial direction, which is disposed at a position where, the mark is formed as an image on the image pickup surface, both at the wide angle end and the telephoto end.

8. The electronic image pickup apparatus according to claim 1, wherein
the image forming optical system, at the time of zooming from the wide angle end to the telephoto end, is a zoom lens in which, distances between lens units change, and
the electronic image pickup apparatus comprising:
an image pickup element moving portion which movably holds the image pickup element, wherein
the image pickup element moving portion adjusts at least shifting or tilting of the image pickup element at the wide angle end, and
the image pickup element moving portion holds the image pickup element to be fixed, at the telephoto end.

9. The electronic image pickup apparatus according to claim 1, wherein
the signal processing section reads a correction parameter from the correction parameter storage section according to at least any one of a zoom state, a focused state, a shifted state, a tilted state, and an aperture value, and
the signal processing section, further calculates a correction parameter of an intermediate state by an interpolation operation, based on the correction parameters in a plurality of states.

10. The electronic image pickup apparatus according to claim 1, wherein the mark includes a set of two lines extended in a radial direction.

11. The electronic image pickup apparatus according to claim 1, comprising:
a noise correction parameter calculating section which calculates a noise correction parameter based on the correction parameter; and
a noise correction section which corrects the image which has been picked up by the image pickup element, based on the noise correction parameter.

12. The electronic image pickup apparatus according to claim 1, wherein the mark is formed on a surface of the lens on which the mark has been formed, for which an absolute value of curvature is the smallest.

13. The electronic image pickup apparatus according to claim 1, wherein the mark is formed on a surface on the image side than the surface nearest to object side.

* * * * *